UNITED STATES PATENT OFFICE.

GEORGE FREDERICK NEWMAN, OF RANGITATA, NEW ZEALAND.

COMPOSITION FOR RENDERING GARMENTS WATERPROOF.

SPECIFICATION forming part of Letters Patent No. 639,087, dated December 12, 1899.

Application filed May 10, 1898. Serial No. 680,290. (No specimens.)

*To all whom it may concern:*

Be it known that I, GEORGE FREDERICK NEWMAN, a subject of the Queen of Great Britain and Ireland, and a resident of Peel Forest, Rangitata, Canterbury, in the Colony of New Zealand, have invented a certain new and useful Composition to be Used for Rendering Garments and other Articles Waterproof, of which the following is a specification.

The object of this invention is to provide a simple and effective composition of matter to be used for the purpose of rendering waterproof garments and other articles made of material usually employed when required to be rendered waterproof. It is applicable to garments of different kinds—vehicle-aprons, rick-cloths, horse-covers, tarpaulins, and other articles required to be rendered waterproof.

My composition consists of the following ingredients, combined in the proportions stated, viz: boiled linseed-oil, three gallons; castor-oil, one gallon; turpentine, twelve pints; powdered sulfur, a quarter of an ounce. Add yellow ocher or other suitable coloring-matter sufficient to obtain the desired color. I prefer yellow ocher for coloring, but vegetable black or powdered white zinc may be used for producing black or gray compositions, respectively. Other suitable coloring-matters may be used to produce desired colors, or the composition may be used without coloring-matter. These ingredients are mixed together in a suitable vessel and heated to boiling-point in order to thoroughly incorporate them.

The composition is applied while hot to the garments or other articles by means of a brush or in any other suitable manner, three coats of the composition being required in order to render the garments or other articles thoroughly waterproof. After the first coating is applied it is allowed to remain until the composition is thoroughly dry, when the second coating is applied, and as soon as this is dry the third or finishing coating is applied, and when dry the garment or other article to which the composition is so applied is rendered thoroughly waterproof.

After its application this composition does not become sticky or crack or peel off; neither does it injure the material to which it is applied.

Having now described my invention, what I claim as new, and desire to secure by Letters Patent, is—

A waterproofing compound consisting of boiled linseed-oil three gallons, castor-oil one gallon, turpentine twelve pints and powdered sulfur one-fourth ounce substantially as described.

In witness whereof I have hereunto set my hand in presence of two witnesses.

GEORGE FREDERICK NEWMAN.

Witnesses:
  A. H. HART,
  GEORGE HART.